Nov. 24, 1964    F. W. PACKARD    3,158,700
MOUNTING ASSEMBLY FOR DRAWOUT SWITCHGEAR UNIT
HAVING TRACK FOR FORWARDLY TILTING
UNIT IN DISCONNECTED POSITION
Filed March 10, 1961    4 Sheets-Sheet 1
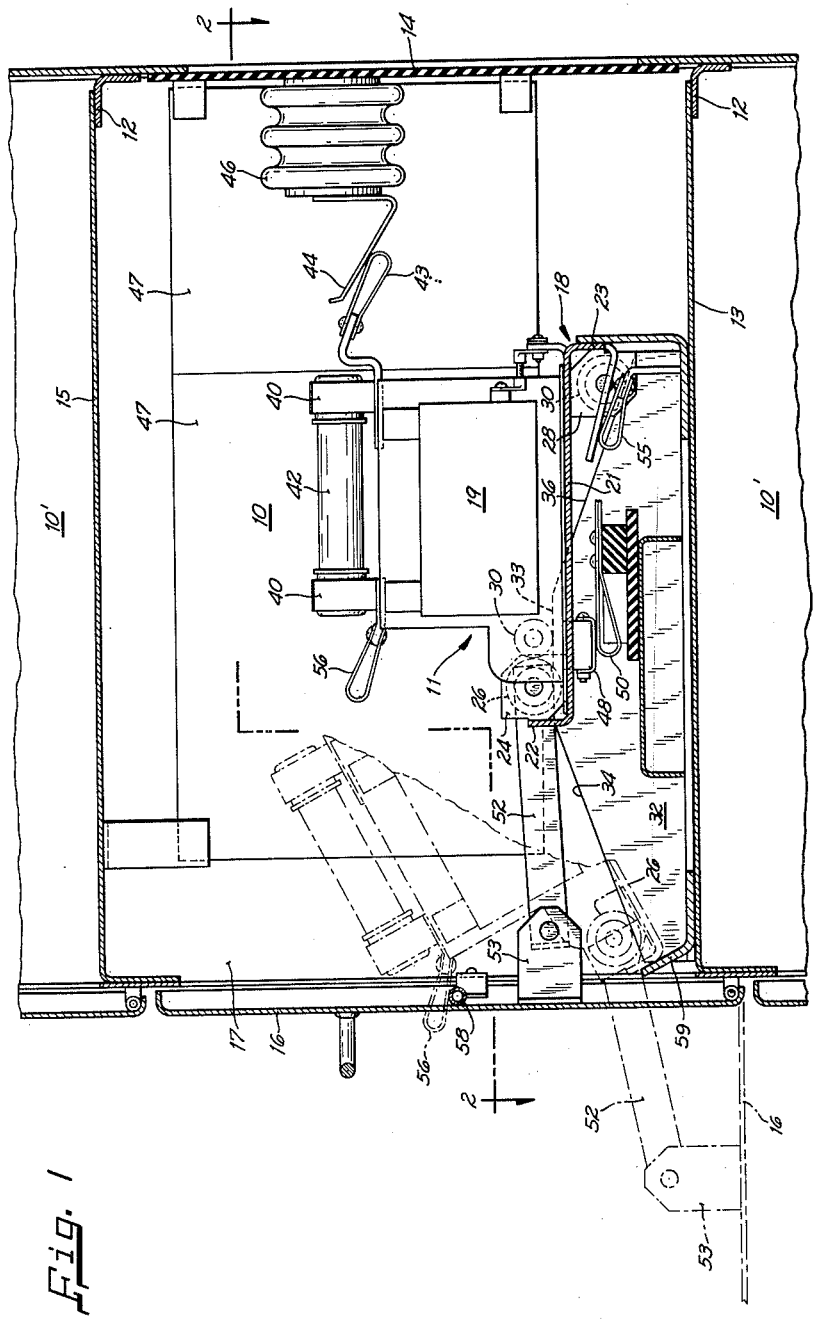
Fig. I
INVENTOR.
Frederick W. Packard
BY
Fred. Wivrott
Attorney

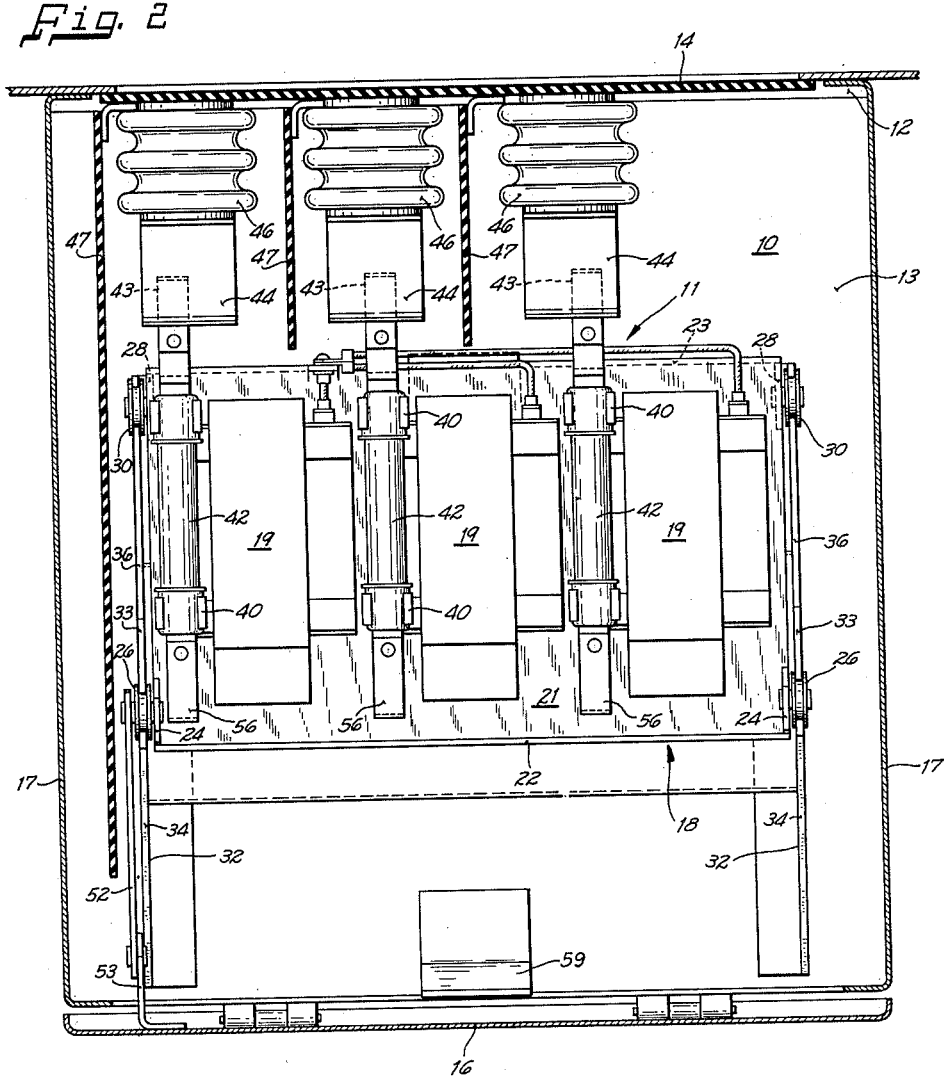

Nov. 24, 1964            F. W. PACKARD            3,158,700
MOUNTING ASSEMBLY FOR DRAWOUT SWITCHGEAR UNIT
HAVING TRACK FOR FORWARDLY TILTING
UNIT IN DISCONNECTED POSITION
Filed March 10, 1961            4 Sheets-Sheet 3
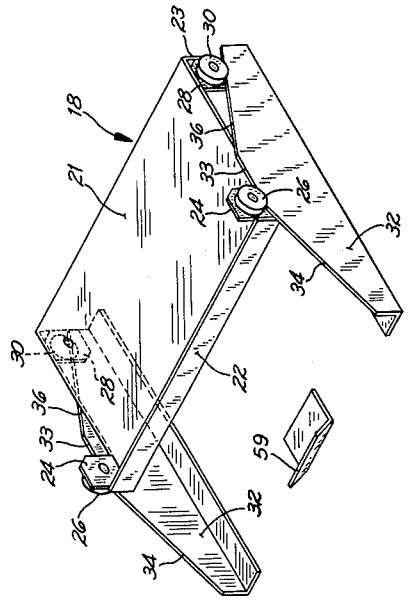
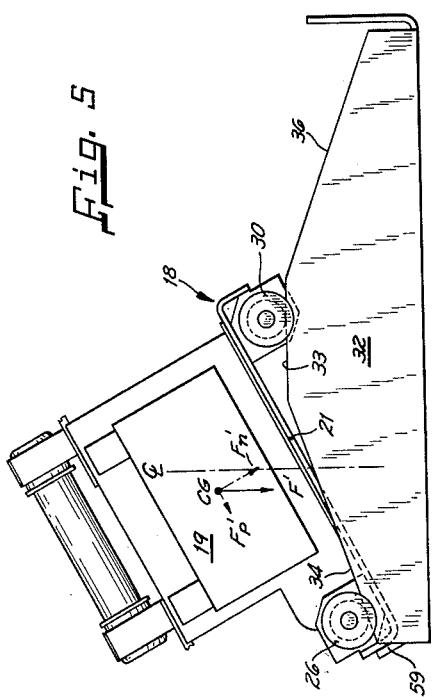
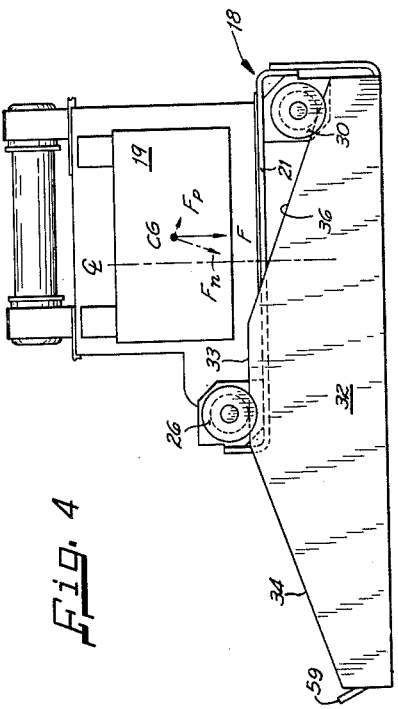
INVENTOR.
Frederick W. Packard
BY
Fred Wixrott
Attorney Nov. 24, 1964  F. W. PACKARD  3,158,700
MOUNTING ASSEMBLY FOR DRAWOUT SWITCHGEAR UNIT
HAVING TRACK FOR FORWARDLY TILTING
UNIT IN DISCONNECTED POSITION
Filed March 10, 1961  4 Sheets-Sheet 4

INVENTOR.
Frederick W. Packard
BY Fred Wiriott
Attorney

United States Patent Office 3,158,700
Patented Nov. 24, 1964

1

3,158,700
MOUNTING ASSEMBLY FOR DRAWOUT SWITCH-
GEAR UNIT HAVING TRACK FOR FORWARDLY
TILTING UNIT IN DISCONNECTED POSITION
Frederick W. Packard, Canonsburg, Pa., assignor to Mc-
Graw-Edison Company, Milwaukee, Wis., a corpora-
tion of Delaware
Filed Mar. 10, 1961, Ser. No. 94,787
11 Claims. (Cl. 200—50)

This invention relates to electrical apparatus and, more particularly, to auxiliary equipment associated with metal enclosed drawout type switchgear movable horizontally into and out of metal enclosures.

It is common practice in switchgear assemblies to provide fused potential transformers for energizing relays and instruments from the main power system and also disconnecting fuses for the protection of various portions of the system. Because the terminals of such disconnect fuses and fused potential transformers are at a high potential, they are housed in metal enclosures. Disconnecting mechanisms for such auxiliary units take a variety of forms. One type includes a frame movably mounted in the cubicle and a hinged front panel coupled to the frame so that pivotal movement of the front panel to its open position will move the auxiliary unit out of its connected position within the enclosure and to the front portion thereof where it is safely grounded and will be accessible for maintenance inspection and changing the fuses. In some prior art installations, the auxiliary units are mounted horizontally on drawers which must be withdrawn from the enclosure in order to perform such servicing procedures. This produces a substantial overhang load requiring additional strength in the supporting structure. In order to facilitate such servicing procedures without the overhang problem inherent in horizontally mounted devices, the frames of many prior art units support the disconnect fuse or potential transformer in a diagonally tilted position relative to the cubicle. However, because proper electrical clearance must be maintained between a switchgear unit and the metallic cubicle walls, it is necessary that cubicles housing diagonally mounted devices have a greater height than those housing horizontally mounted units.

The mounting frames which support these types of switchgear units are generally provided with rollers that engage rails in the bottom of the enclosure for ease of movement into and out of their connected position. As a result, there is an inherent possibility that unless restrained such mounting frames will accidentally roll between its various positions if the rails are not carefully leveled.

It is an object of the invention to provide drawout type switchgear units with a mounting assembly that supports such units in a substantially horizontal connected position and in a forwardly tilted position when they are in their disconnected position so that they will be easily accessible for servicing.

Another object of the invention is to provide supporting means for horizontal drawout type switchgear assemblies which prevent accidental movement of the assembly between connected and disconnected positions.

These and other objects and advantages of the instant invention will become more apparent from the detailed description of a preferred embodiment thereof taken with the accompanying drawings in which:

FIG. 1 is a side elevational view, partly in section, of a drawout type switchgear apparatus embodying the instant invention;

FIG. 2 is a view taken along lines 2—2 of FIG. 1;

FIG. 3 is a perspective view of a portion of the assembly shown in FIG. 1;

2

Figure 6:
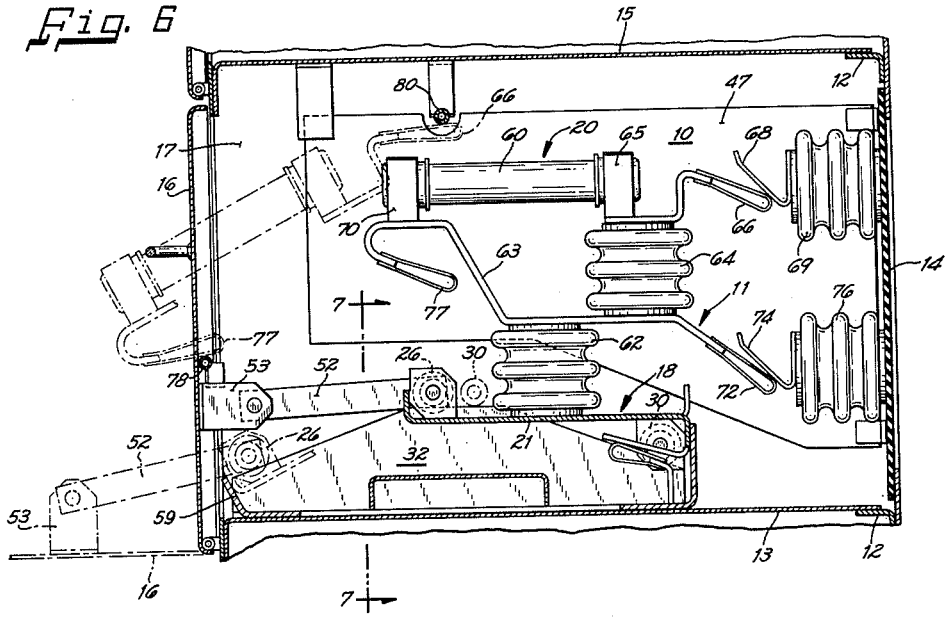
Figure 7:
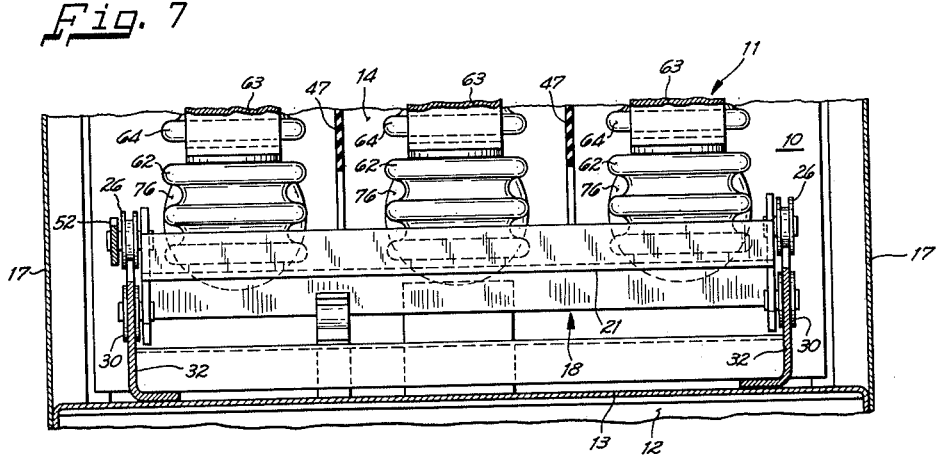

FIGS. 4 and 5 are diagrammatic views illustrating the operation of the device shown in FIG. 1;

FIG. 6 is a side elevational view, partly in section, illustrating another application of the instant invention; and FIG. 7 is a view taken along lines 7—7 of FIG. 6.

In general terms, the invention comprises a supporting assembly constructed and arranged to support a drawout type switchgear unit in a horizontal connected position and to tilt it forwardly as it is being moved to its disconnected position so that it will be accessible for servicing and maintenance.

According to a more specific aspect of the invention, the mounting frame is disposed on a track having an elevated central portion and downwardly sloping front and rear portions. The carriage frame has a supporting base and front and rear rollers wherein the rear rollers are lower relative to the frame than the front rollers. In addition, the front rollers are disposed on the elevated central portion of the track and the rear rollers on the depressed rear portion thereof when it is in its connected position. When the unit is moved to its disconnected position the front rollers move to the depressed front portion of the track while the rear rollers move to the elevated central portion thereof thereby tilting the unit forwardly.

In addition, the switchgear device is mounted in such a manner that when it is in its connected position its center of gravity has a component acting through the rear wheels in a direction parallel to the downwardly sloping rear portion of the track thereby tending to hold the unit in its connected position. The front rollers being on the elevated central portion of the track do not oppose this gravitational force. Similarly, when the unit has been moved to its disconnected position at the front of the cubicle, its center of gravity has a component acting through the front rollers in parallelism with the downwardly sloping front portion of the track while the rear rollers being on the elevated central portion of the track does not oppose this gravity component.

Referring now to the drawings in greater detail, FIGS. 1 and 2 show a metal enclosure 10 which is a portion of a larger switchgear assembly (not shown) having additional cubicles 10′ and 10″. The housing 10 encloses a switchgear assembly 11 and includes metallic angle members 12 and bottom, rear, top, front and side wall panels 13, 14, 15, 16 and 17 respectively. It will be understood that some of these wall panels also form the marginal boundaries of adjacently disposed cubicles 10′ and 10″. The switchgear assembly 11 includes a mounting frame 18 for supporting a switchgear unit which may consist of either a fused potential transformer 19 as shown in FIGS. 1, 2, 4 and 5 or a disconnecting fuse assembly 20 as shown in FIGS. 6 and 7.

As seen in particular in FIG. 3, the mounting frame 18 includes a planar base 21 upon which the switchgear unit 19 (FIG. 1) or 20 (FIG. 6) rests, an upwardly extending front panel 22 and a downwardly extending rear panel 23. A pair of bracket members 24 extend upwardly from each of the front corners of the frame 18 and rotatably support a roller 26. In addition, a pair of downwardly extending brackets 28 are affixed to each of the rear corners of the frame 18 and each has a similar roller 30 rotatably affixed thereto.

Each of the front and rear rollers 26 and 30 run on a track 32 characterized by an elevated, substantially horizontal, central portion 33, a downwardly sloping front portion 34 and a downwardly sloping rear portion 36. In the preferred embodiment, the front and rear portions 34 and 36 have substantially equal lengths and extends downwardly from the central portion 33 at substantially equal angles.

The horizontal distance between the axes of rotation of the front and rear rollers 26 and 30 is substantially equal to the distance between the elevated central portion 33 of track 32 and that point on the rear portion 36 engaged by the rollers 30 when the unit 19 is in its connected position. As a result, when the unit 11 is in its connected position, the base 21 will be substantially horizontal as shown in FIGS. 1, 4 and 6.

As seen in FIG. 2, three potential transformers are provided with fuse terminals 40 for receiving a protective fuse 42. Each transformer 19 is also provided with a primary disconnect contact 43 which is constructed and arranged to engage a cooperating contact 44 supported by an insulator 46 at the rear of the enclosure 10. In addition, phase barriers 47 may be affixed to the rear panel 14 for isolating the contacts 44. Secondary contact members 48, as seen in FIG. 1, are carried by the frame 18, and are arranged to engage cooperating contact members 50 mounted on the bottom panel 13 between rails 32, when the switchgear unit 19 is in its connected position relative to contacts 44. In this manner, the secondary windings of the transformer 19 may be electrically connected to supply auxiliary power to the relaying and instrumentation circuits (not shown) which are connected to the contacts 50.

The drawout mechanism for the switchgear assembly 11 includes a link 52 pivotally connected at one end to one of the front roller brackets 24 and at its other end to a bracket 53 affixed to the front door panel 16. As seen in FIG. 1, when the front wall panel 16 is moved from its vertical or closed position as shown by full lines, to its open or horizontal position as shown by phantom lines, the link 52 draws frame 18 forwardly in the housing as the rollers 26 and 30 move along the tracks 32.

The mounting frame 18 is initially grounded by means of a contact 55 mounted on the bottom panel 13 while the potential transformer 19 is grounded when it reaches its fully disconnected position by a contact 56 which engages a grounding contact 58 secured to the front of the cubicle 10, as seen in FIG. 1.

As stated hereinabove, when the switchgear unit 19 is in its connected position, shown in FIG. 4, it will be substantially horizontal with the front wheels 26 of frame 18 resting on the elevated central portion 33 of the track 32 and the rear wheels 30 on the lower end of the sloping rear portion 36. When the switchgear unit 19 is racked from its connected position shown in FIG. 4 to its disconnected position shown in FIG. 5, upon the opening of the front panel 16, the front wheels 26 roll down the front portion 34 of track 32 until panel 22 engages a stop 59 on the bottom panel 13 while the rear wheels 30 roll to the raised central portion 33. When the frame is in this position, the potential transformer 19 is tilted forwardly to permit easy maintenance, inspection and replacement of the fuse 42. Hence, it can be seen that the drawout mechanism, according to the instant invention, allows the switchgear unit 19 to be horizontally mounted when in its connected position so that the overall height of the cubicle 10, necessary to permit electrical clearance between the fuse clips 40 and the upper panel 15, may be substantially less than would be the case if the switchgear unit were initially tilted. However, because the supporting mechanism tilts the switchgear unit 19 after it has been disconnected all of the advantages of a tilted device such as ease of inspection, maintenance and the replacement of fuses is still achieved.

It will be appreciated that the unit 19 will tilt both because the front rollers 26 move to the front portion 34 of track 32 and also because of the movement of the rear rollers 30 to the elevated portion 33 of said track. Also, because the rear rollers 30 are below the plane of the bed 21, they will substantially double the degree of tilt over that attributable solely to the lowering of the front rollers 26. It can be seen also that the same effect could be obtained by having both front and rear rollers at the same elevation and using rollers having a larger diameter at the rear of frame 18 than at the front.

FIGS. 4 and 5 illustrate yet another advantage of the instant invention. As seen in FIG. 4, when the switchgear assembly 11 is in its connected position its center of gravity designated CG lies to the right of the center line of the frame 18. This is because the potential transformer 38 is mounted toward the rear of the base 20. If the vertical force F generated by the center of gravity is divided into its components, it will have a first component $F_n$ perpendicular to the rear portion 36 of the track 32 and a second portion $F_p$ parallel thereto. As a result, the component $F_p$ acting toward the rear of the enclosure 10 will tend to hold the assembly in its connected position.

When the switchgear assembly 11 is moved to its disconnected, or drawout position, as shown in FIG. 5, its center of gravity will then be acting on the lefthand side of the center line of the frame 18. The center of gravity now lies on the other side of the center line because as the left end of the frame 18 is lowered, its center line shifts to the right. Here again, it can be seen that the force F' generated by the weight of the device will have a component $F_p'$ parallel to the front portion 34 of the track 32. This component $F_p'$, acting toward the front of the enclosure 10, tends to hold the switchgear assembly 11 in its disconnected position. It can be seen, therefore, that when the switchgear unit is in each of its connected and disconnected positions, a component of force generated by its center of gravity will be acting in a direction tending to hold it in this position. Therefore, even if there is some horizontal misalignment in the cubicle 10 there will be no tendency for the switchgear assembly 11 to roll out of either of its connected or disconnected positions.

FIG. 6 illustrates how the racking and supporting mechanism according to the instant invention may be adapted to a disconnect fuse assembly 20 having a fuse 60. Here an insulator 62 is mounted on the base 21 and supports an angular conductive member 63. A second insulator 64 supports the rear fuse terminals 65 and a contact 66 adapted to engage a stationary cooperating contact 68 mounted on an insulator 69 affixed to the rear panel 14. At one end of the conductive member 63 is a second pair of fuse terminals 70 for receiving one end of the fuse 60 while a second disconnect contact 72 engages a second cooperating stationary disconnect contact 74 mounted on an insulator 76 which is also affixed to the rear panel 14. In addition, the conductive member 63 carries a grounding contact 77 for engagement with a fixed grounding contact 78 mounted at the front end of cubicle 10, while a second grounding contact 80, affixed to the top panel 15, is engageable by the disconnect contact 66 when the assembly is moved to its disconnected position shown by phantom lines in FIG. 6. Here again, it can be seen that assembly 20 is initially in a horizontal connected position so that the over-all height of the cubicle 10 may be held to a relatively small value while proper electrical clearance is maintained between the assembly 20 and the upper panel 15. However, when the device is moved to its disconnected position fuse 39 is tilted forwardly for easy removal and replacement.

In the same manner as discussed with respect to the potential transformer 19, a component of the force generated by the center of gravity of the fuse assembly 20 of FIG. 6 will tend to hold it in each of its connected and disconnected positions relative to the contacts 68 and 74.

While the switchgear units 19 and 20 have been shown and described as being horizontal when in their connected positions it would be understood that a small initial angle is also contemplated. In addition, while only a single embodiment of the invention has been shown and described and while it has been illustrated and discussed with reference to a particular type of switchgear apparatus, it is intended that the invention be limited thereby, but only by the scope of the appended claims.

I claim:

1. In a horizontal drawout switchgear assembly, an enclosure having a front access panel movable from a closed position to an open position and stationary disconnect contacts on the interior thereof, a switchgear unit having disconnect contacts for cooperatively engaging said stationary disconnect contacts, drawout means coupled to said switchgear unit for moving said unit out of engagement with said stationary disconnect contacts and from a connected position adjacent said stationary disconnect contacts to a disconnected position adjacent said front access panel, and guide means for supporting and guiding said switchgear unit in its movement between its connected and disconnected positions, said guide means supporting said switchgear unit in a substantially horizontal manner when it is in its connected position and in a forwardly tilted manner when it is in its disconnected position adjacent said front access panel, said guide means including means adjacent said front access panel for preventing movement of said switchgear unit outwardly of said enclosure.

2. In a horizontal drawout switchgear assembly, an enclosure having a front access opening and stationary disconnect contacts on the interior thereof, a switchgear unit having disconnect contacts for cooperatively engaging said stationary disconnect contacts, drawout means for moving said unit in a generally horizontal direction to disengage said movable disconnect contacts from said stationary disconnect contacts and to a position adjacent said front access opening, and guide means for supporting said switchgear unit in a substantially horizontal manner when it is in its connected position and for tilting it forwardly as it is moved to its disconnected position adjacent said front access opening, said guide means including means adjacent said front access opening for supporting said switchgear unit in said tilted position and for preventing movement thereof outwardly of said enclosure.

3. In a horizontal drawout switchgear assembly, an enclosure having a front access panel and stationary disconnect contacts on the interior thereof, said front access panel being movable between open and closed positions, a switchgear unit having disconnect contacts for cooperatively engaging said stationary disconnect contacts, drawout means including link means connected at one end to said front access panel and at its other end to said switchgear unit for moving said unit from a connected position adjacent said stationary disconnect contacts to a disconnected position adjacent said front access panel upon movement of the latter to its open position, and guide means for supporting and guiding said switchgear unit in its movement between its connected and disconnected positions, said guide means supporting said switchgear in a substantially horizontal manner when it is in its connected position and in a forwardly tilted manner when it is in its disconnected position adjacent said front access panel, said guide means including means adjacent said front access panel for preventing movement of said switchgear unit outwardly of said enclosure.

4. In a horizontal drawout switchgear assembly, an enclosure having a front access panel movable between open and closed positions and stationary disconnect contacts on the interior thereof, a switchgear unit having disconnect contacts for cooperatively engaging said stationary disconnect contacts, drawout means coupled to said switchgear unit and to said panel for moving said unit from a connected position adjacent said stationary disconnect contacts to a disconnected position adjacent said front access panel when said panel is moved to its open position, and guide means for supporting and guiding said switchgear unit in its movement between its connected and disconnected position, said guide means including a shaped track having a first portion on the interior of said cubicle for supporting said switchgear unit in a substantially horizontal manner when it is in its connected position, and a second portion adjacent the front access panel for supporting said unit in a forwardly tilted manner when it is in its disconnected position, said guide means also including stop means for preventing movement of said switchgear unit outwardly of said enclosure.

5. In a horizontal drawout switchgear assembly, an enclosure having a front access panel, a switchgear unit, mounting means for said switchgear unit movable into and out of a connected position at the rear of said enclosure, guide means for supporting and guiding said mounting means within said enclosure, said guide means having an elevated portion within said enclosure and a depressed portion adjacent the rear thereof, said mounting means having an inner end disposed on the depressed portion of said guide means to support said unit in a substantially horizontal position when it is in its connected position, drawout means for moving said mounting means to its disconnected position adjacent said front access panel and for moving the inner end of said mounting means onto the elevated portion of said guide means so that the switchgear unit is tilted forwardly.

6. In a horizontal drawout switchgear assembly, an enclosure having a front access panel, a switchgear unit, mounting means for said switchgear unit movable into and out of a connected position at the rear of said enclosure, guide means for supporting and guiding said mounting means within said enclosure, said guide means having an elevated portion within said enclosure and a depressed portion adjacent said front access panel, said mounting means being in a substantially horizontal position with its front end disposed on the elevated portion of said guide means when said switchgear unit is in its connected position, drawout means for moving said mounting means to its disconnected position at the front of said enclosure and thereby moving the front end of said mounting means onto the depressed portion of said guide means so that the switchgear unit is tilted forwardly.

7. In a horizontal drawout switchgear assembly, an enclosure having stationary disconnect contacts and a front access panel, a switchgear unit having movable disconnect contacts, track means within said enclosure, said track means having an elevated central portion and depressed front and rear portions, a mounting frame for said switchgear unit disposed on said track means for moving said unit between a connected position and a disconnected position adjacent said front access panel, a first guiding means affixed to the rear of said mounting frame, a second guiding means affixed to the front of said mounting frame and being elevated relative to said first guiding means, said first and second guiding means cooperatively engaging said depressed rear portion and said elevated central portions respectively of said track means when said switchgear unit is in its connected position so that said unit is supported horizontally, and drawout means for moving said frame to a position adjacent said front access panel upon the opening thereof, said first guide means being moved to said elevated central portion and said second portion being moved to said depressed front portion of said track when said switch gear unit is moved to its disconnected position whereby said unit is tilted forwardly.

8. In a horizontal drawout switchgear assembly, an enclosure having stationary disconnect contacts and a front access panel, said front access panel being movable between open and closed positions relative to said enclosure, a switchgear unit having movable disconnect contacts, track means within said enclosure, said track means having an elevated central portion and depressed front and rear portions, a mounting frame for said switchgear unit disposed on said track means for moving said unit between a connected position and a disconnected position adjacent said front access panel, a first pair of guide rollers mounted at the rear of said mounting frame, a second pair of guide rollers mounted at the front of said mounting frame and being elevated relative to said first pair of guide rollers, said first and second guide rollers cooperatively engaging said depressed rear portion and said elevated central portions respectively of said track means when said switchgear unit is in its connected position so that said unit is supported horizontally, and drawout means including a link connected at one end to said front access panel and at its other end to said mounting frame for moving said frame to a position adjacent said front access panel upon the opening thereof, said first guide means being moved to said elevated central portion and said second portion being moved to said depressed front portion of said track when said switchgear unit is moved to its disconnected position whereby said unit is tilted forwardly.

9. In a horizontal drawout switchgear assembly, an enclosure having stationary disconnect contacts and a front access panel, a switchgear unit having movable disconnect contacts for cooperatively engaging said stationary contact means, guide means within said enclosure, and mounting means for said switchgear unit disposed on said guide means for moving said unit between a connected position and a disconnected position adjacent said front access panel, said guide means having an inner end disposed toward said stationary disconnect contacts and an outer end disposed toward said front access panel, said guide means supporting the inner end of said mounting means below its outer end when said unit is in its connected position, said guide means also supporting the outer end of said unit below its inner end when said unit is in its disconnected position so that the weight of said unit will tend to hold it in each of its connected and disconnected positions against accidental movement due to misalignment.

10. In a horizontal drawout switchgear assembly, an enclosure having stationary disconnect contacts and a front access panel, a switchgear unit having movable disconnect contacts, guide means within said enclosure, said guide means having an elevated central portion and downwardly sloping front and rear portions, and a mounting frame for said switchgear unit disposed on said guide means for moving said unit between a connected position and a disconnected position adjacent said front access panel, the inner end of said mounting frame engaging the downwardly sloping rear portion of said guide means when the unit is in its connected position and the outer end engaging the downwardly sloping front portion when the unit is in its disconnected position so that said unit will be held in each of said positions by its own weight.

11. In a horizontal drawout switchgear assembly, an enclosure having stationary disconnect contacts and a front access panel, a switchgear unit having movable disconnect contacts, shaped guide means disposed within said enclosure, a mounting frame movably engaging said guide means for supporting said switchgear unit within said enclosure, drawout means for moving said switchgear unit on said guide means between a connected position adjacent the rear of said enclosure and a disconnected position adjacent said front access panel, said guide means being constructed and arranged to support said switchgear assembly with its center of gravity having a component extending inwardly of said housing when said assembly is in its connected position and with a component extending outwardly of said housing when said assembly is in its disconnected position adjacent said front access panel.

References Cited in the file of this patent

UNITED STATES PATENTS

| | | |
|---|---|---|
| 2,414,555 | Pierson et al. | Jan. 21, 1947 |
| 2,504,876 | Pringle | Apr. 18, 1950 |

FOREIGN PATENTS

| | | |
|---|---|---|
| 225,666 | Great Britain | Dec. 11, 1924 |